C. D. SMITH.
WATER-GAGE.

No. 191,724. Patented June 5, 1877.

Witnesses:
O. C. Weaver
W. W. Wirt.

Inventor:
Chas. D. Smith.

UNITED STATES PATENT OFFICE.

CHARLES D. SMITH, OF BOSTON, MASSACHUSETTS.

IMPROVEMENT IN WATER-GAGES.

Specification forming part of Letters Patent No. 191,724, dated June 5, 1877; application filed July 12, 1875.

*To all whom it may concern:*

Be it known that I, CHARLES D. SMITH, of Boston, in the county of Suffolk and State of Massachusetts, have invented certain new and useful Improvements in Water-Gages for Steam-Boilers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to produce a water-gage for steam-boilers, &c., that is more reliable and safe, and not as likely to become clogged up as the water-gages now in use, in which, as is well known to all engineers and others using them, the water-passages leading to the glass indicating-tubes invariably do. These passages very easily become choked by the saline matter or sediment contained in the water, and when this occurs the glass tube may even show the water at a proper level, although the communication with the water in the boiler has been really shut off altogether in a single night.

To remedy this great defect is the main object of my invention; and it consists in providing chambers or supporting-heads at the upper and lower ends of the gage or tube, and connecting with the boiler of a cross-section or capacity much greater than that of the glass tube itself.

The glass tube can also be readily removed and be replaced through a hole in the chamber in a central line with the tube.

Figure 1:
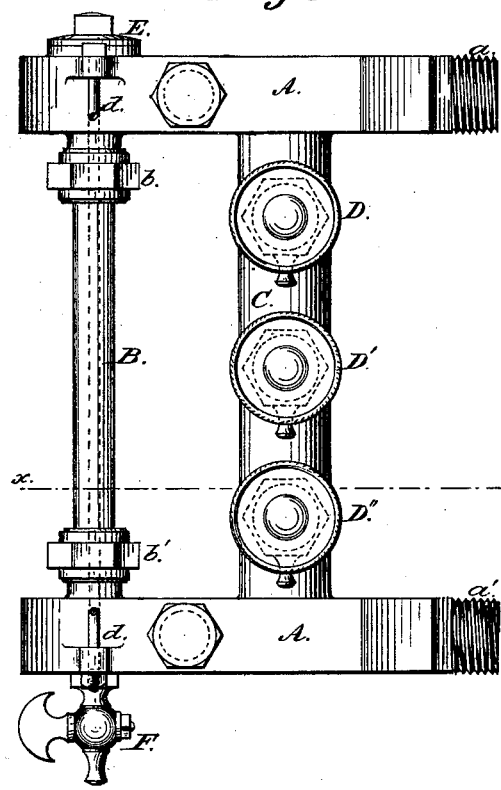
Figure 2:
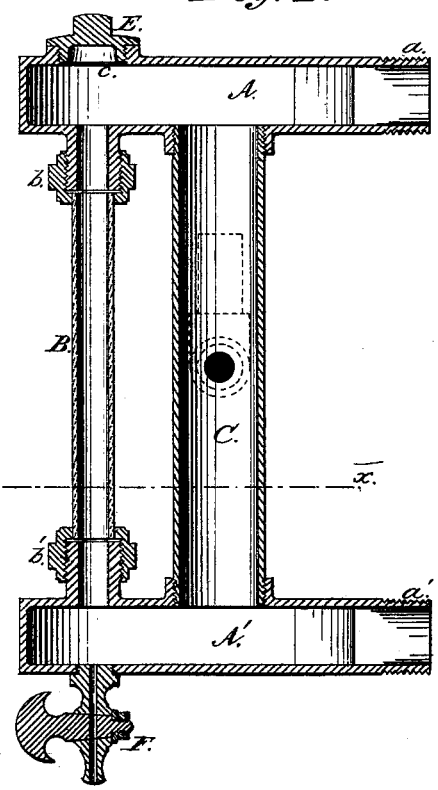
Figure 3:
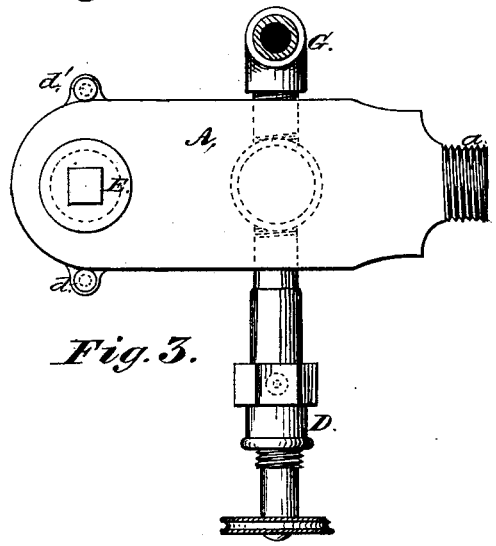
Figure 4:
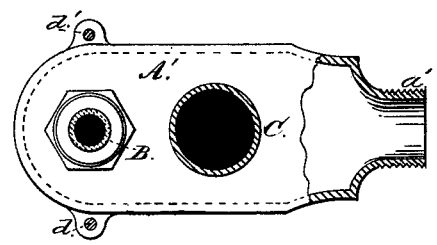

In the accompanying drawing, Figure 1 is a side view of my invention. Fig. 2 is a vertical cross-section of the same. Fig. 3 is a top or plan view thereof, and Fig. 4 is a cross-section on line $x\,x$.

In the drawing, A A' represent the upper and lower chambers or supporting-heads, made of any suitable material, size, and shape, and having a much greater area of cross-section than the glass tube B. These chambers or heads are connected together by a pipe, C, which may be secured thereto in any manner, or may be cast in one piece with the chambers. These chambers are provided at their rear ends with screw-threads $a\,a'$, to screw into a stop-cock or globe-valve, that connects them to the boiler.

In the pipe C are arranged the usual gage or try cocks D D' D'', by which the water is usually tested. In the front part of the chamber is arranged the glass tube B, and secured in place by clamp-nuts $b\,b'$, and in a central line with and above said tube is a hole, $c$, which is closed by a plug, E, and through said hole the glass tube may be withdrawn when desired.

In the lower side of the chamber A' is arranged a pet-cock, F, for draining off the water. The chambers are held together by bolts $d\,d'$, which pass through suitable lugs on them.

On the opposite side of the pipe C, on which the gage cocks are arranged, is a pipe or connection, G, for an alarm-whistle or other signal apparatus to indicate danger.

In the sides of the chamber may be arranged peep or loop holes, closed by screw-plugs, to observe or clean out any sediment that might collect therein.

I do not confine myself to the particular shape of the chambers, as they may be made rectangular, square, round, oval, or any other shape, so that they have an area of cross-section much greater than that of the glass tube that indicates the height of water.

The advantages of my water-gage will be readily appreciated by engineers and others, and are, mainly, that the passages leading to the glass tube do not become choked, the parts can be easily examined, and the whole apparatus can be cheaply made or repaired.

Having thus described my invention, what I claim, and desire to secure by Letters Patent, is—

1. The chambers A A' of a water-gage, having connections $a\,a'$ of greater area than the indicating-tube B, substantially as shown, and for the purpose set forth.

2. The combination, with a water-gage, of the chambers A A', having connections $a\,a'$ of greater area than the indicating-tube B, connecting-pipe C, opening $c$, and plug E, as and for the purpose described.

In testimony that I claim the foregoing as my own I hereby affix my signature in presence of two witnesses.

CHAS. D. SMITH.

Witnesses:
E. C. WEAVER,
W. W. WIRT.